COMPOSITE LIGHT REFLECTING ARTICLE
Filed March 20, 1968 3 Sheets-Sheet 1
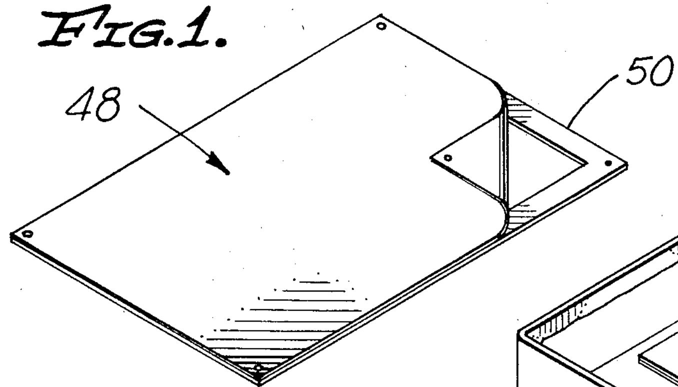
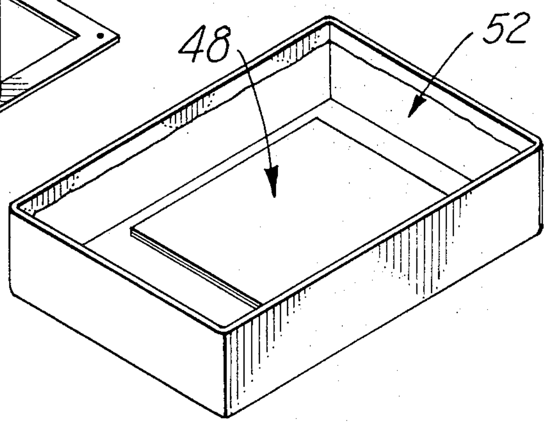
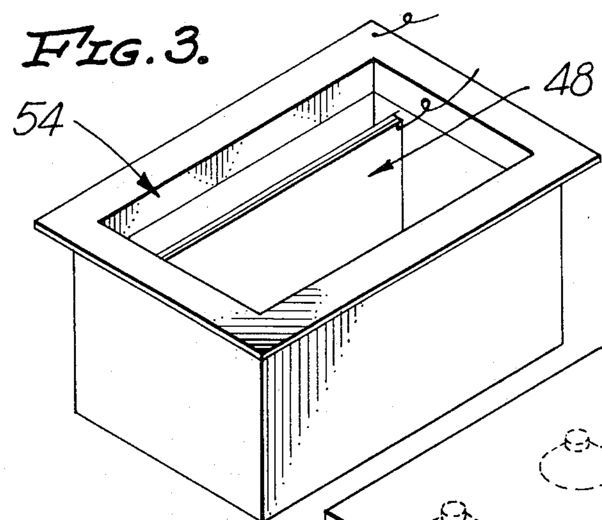
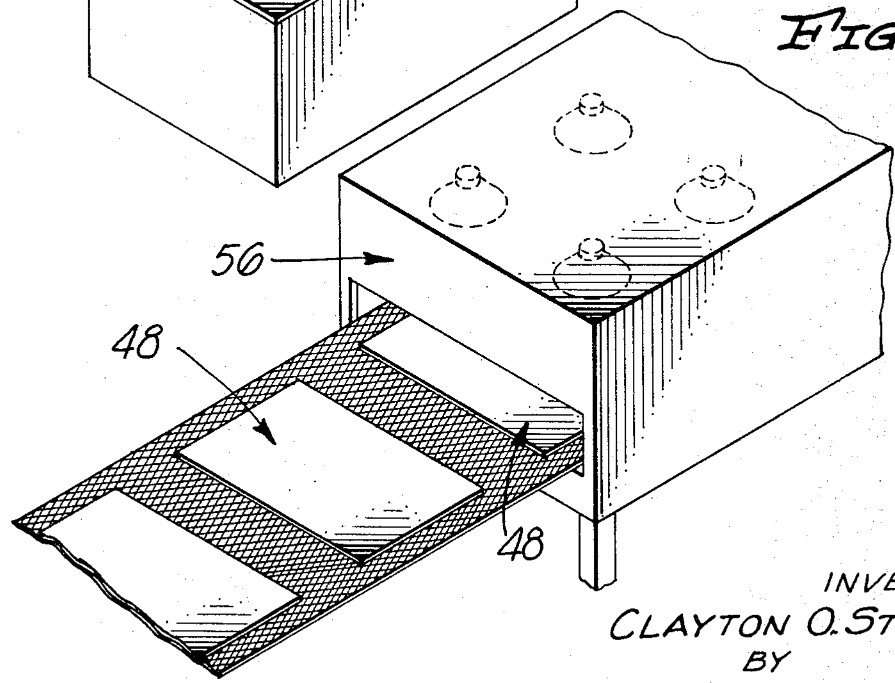
INVENTOR
CLAYTON O. STEVENS
BY
MAHONEY & HORNBAKER
ATTORNEYS COMPOSITE LIGHT REFLECTING ARTICLE
Filed March 20, 1968 3 Sheets-Sheet 2
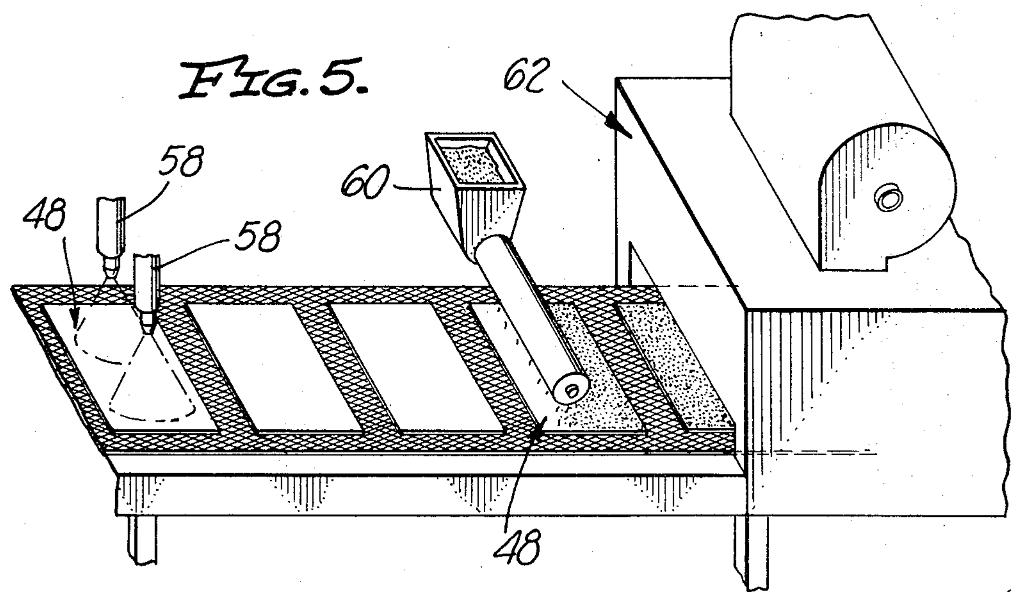
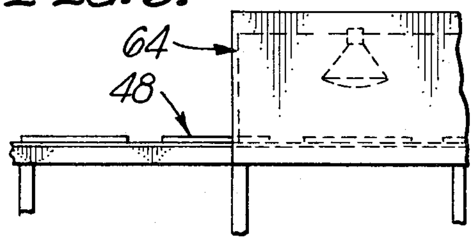
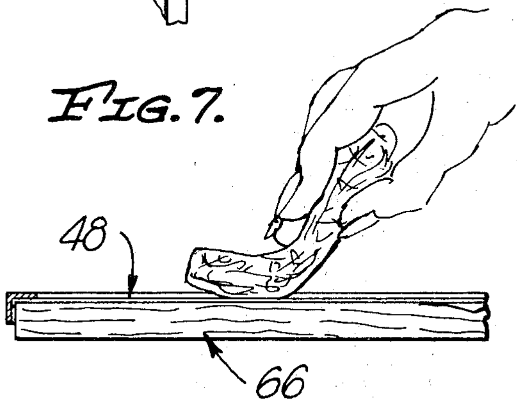
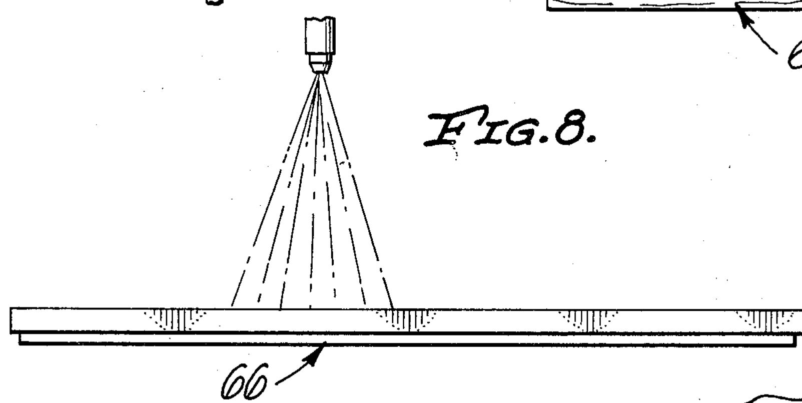
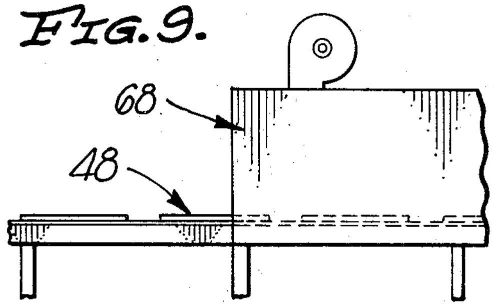
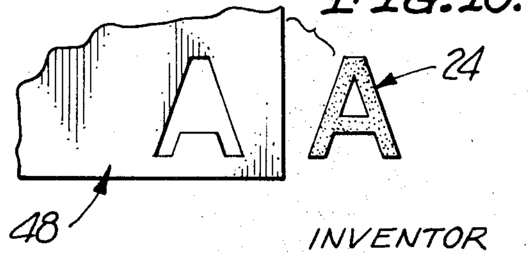
INVENTOR
CLAYTON O. STEVENS
BY
MAHONEY & HORNBAKER
ATTORNEYS COMPOSITE LIGHT REFLECTING ARTICLE
Filed March 20, 1968 3 Sheets-Sheet 3
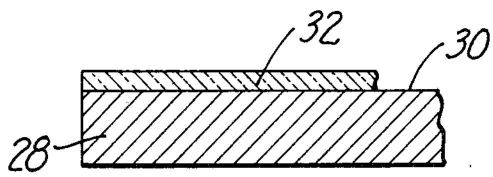
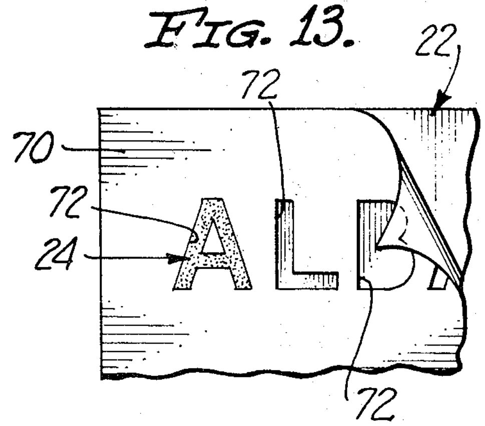
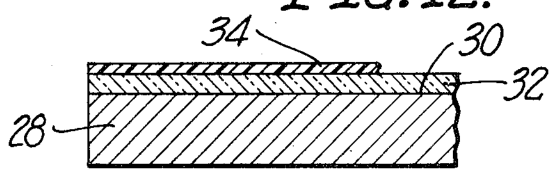
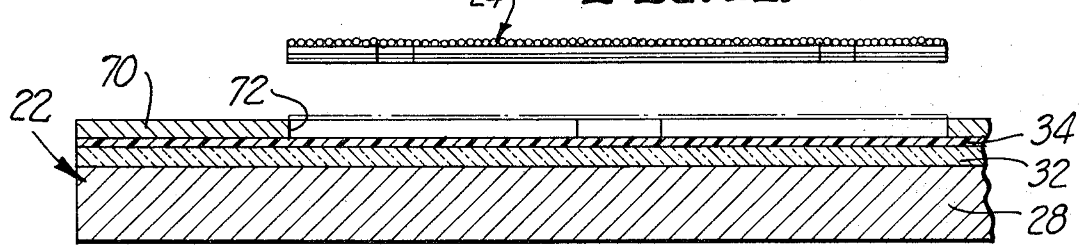
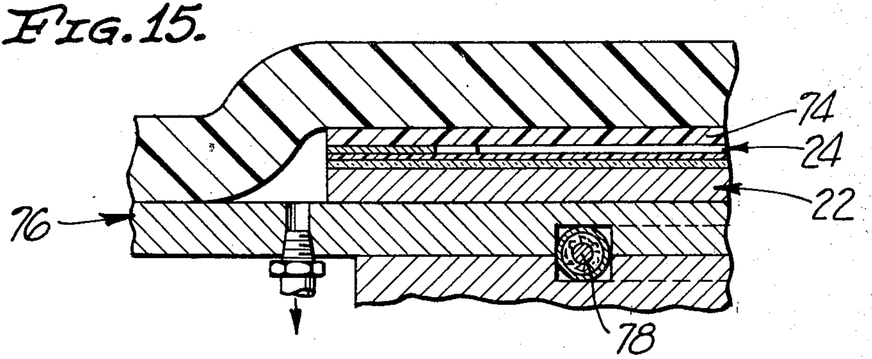
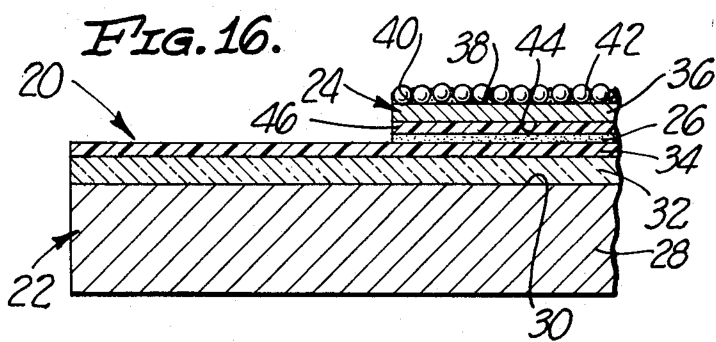
INVENTOR
CLAYTON O. STEVENS
BY
MAHONEY & HORNBAKER
ATTORNEYS United States Patent Office 3,531,883

Patented Oct. 6, 1970

3,531,883

COMPOSITE LIGHT REFLECTING ARTICLE

Clayton O. Stevens, La Mirada, Calif., assignor to California Metal Enameling Company, Los Angeles, Calif., a corporation of California Filed Mar. 20, 1968, Ser. No. 714,524
Int. Cl. G09f 7/00
U.S. Cl. 40—135 6 Claims

ABSTRACT OF THE DISCLOSURE

A sign symbol is prepared by forming and anodizing a reflective face surface on an aluminum foil sheet, coating the face surface with porcelain enamel having light transmitting spheroids partially embedded therein, coating a back surface of the foil sheet with a heat curable adhesive, drying the adhesive below the curing temperature thereof, and then severing a distinguishable symbol from the sheet. The foil symbol is then assembled with the adhesive coated back thereof against a porcelain enameled face of a sign blank and the assembly baked at the adhesive curing temperature to permanently adhere the foil symbol to the sign blank.

BACKGROUND OF THE INVENTION

This invention relates to a composite light reflecting article, such as an outdoor metal sign and the like, and more particularly, to such an article and the methods and procedures for manufacturing the same. Basically, this invention comprises the forming of a metal foil symbol having a beaded, light reflective, porcelain enameled face surface, and securing the completed foil symbol on the porcelain enameled face surface of a sign blank by means of a heat cured adhesive to thereby provide a completed outdoor metal sign and the like. The completed light reflecting article or sign has excellent light reflective qualities and is extremely weather resistant so as to be particularly adapted for outdoor metal sign application.

In the provision of various forms of outdoor metal signs, such as street and traffic signs, advertising signs and various forms of road markers, three basic goals are sought to be attained. Such basic goals are those of maximum light reflectively, maximum durability under varying weather conditions and maximum economy in manufacture and provision. Furthermore, it is important that each of said goals should be attained to the maximum extent possible without one attribute having an adverse effect on the others.

Maximum light reflectivity is extremely important in order that the signs will be readily discernible in both daylight and nighttime use under minimum light conditions. This, of course, is obtained by providing the sign symbols with relatively high light reflectivity so as to be readily discernible from the sign background. Such is particularly important with various forms of highway signs and markers which must be read by a vehicle operator at high speeds and in a minimum period of time.

Various prior attempts have been made to provide outdoor metal signs with symbols of high light reflectivity, such as by the use of light reflecting paints and enamels, and more recently with highly light reflective beaded surfaces. Such beaded surface construction appears to most closely approach the optimum light reflectivity, but has created considerable problems both in manufacturing economy and durability.

For instance, prior to my present invention, it has been necessary to form the symbol beaded surfaces directly on the overall sign blank, an individual sign, of course, normally including a number of such symbols. Thus, slight defects in any one symbol or any part of one symbol during the manufacture of a sign can result in the necessity of scrapping the entire sign so as to greatly increase production cost. In addition, the prior methods of forming the symbol beaded surfaces and the resulting basic construction thereof have been subject to relatively fast deterioration as a result of the outdoor elements, such as sunlight, wind, rain, snow and varying temperature conditions in combination therewith.

OBJECTS AND SUMMARY OF THE INVENTION

It is, therefore, an object of my invention to provide a composite light reflecting article, such as an outdoor metal sign and the like, wherein the sign symbols may be formed with a highly light reflective beaded surface, yet the relatively high cost problems of the prior constructions resulting from defects are eliminated. According to the present invention, the individual sign symbols are formed completely separate from the overall blank, and later applied to said sign blank to form the finished sign, being secured thereto in a permanent manner. As a result, each of the sign symbols may be provided with a highly reflective beaded surface and inspected for surface imperfections prior to any sign blank attachment, so that defective sign symbols may be individually eliminated and scrapped without causing the loss of the more extensive and overall sign construction.

It is a further object of my invention to provide a composite light reflecting article, such as an outdoor metal sign and the like, of the foregoing character in which the individual sign symbols are formed having a base structure of metal foil, the entire preparation of such sign symbols being completed prior to application thereof to the final metal sign blank, and the final assembly of said symbols on the sign blank accomplished in a relatively simple, efficient and durable manner. The individual metal foil symbols are formed with fired porcelain enamel coatings on the face surfaces thereof, said coatings having light transmitting spheroids or beads partially embedded therein so as to provide finished symbols which are extremely durable and weather resistant. In the final sign assembly operations, the completed sign symbols are secured to a fired procelain enameled face surface of the sign blank by means of an adhesive heat cured at a relatively high temperature, thereby providing a completed sign which is also durable and highly weather resistant.

It is still a further object of my invention to provide a composite light reflecting article, such as an outdoor metal sign and the like of the foregoing character, wherein the entire sign construction may be formed of materials having the maximum corrosion resistance, and particularly resistant to corrosive deterioration by weather elements. The corrosion resistant attributes of the previously discussed fired porcelain enamel coatings are well known and documented. In addition, it is preferred to form the symbols of aluminum foil and the sign blank of sheet aluminum, thereby providing an overall sign construction of maximum durability.

Other objects and advantages of the invention will be apparent from the following specification and the accompanying drawings which are for the purpose of illustration only.

BRIEF DESCRIPTION OF THE DRAWINGS

FIG. 1 is a perspective view of a metal foil sheet temporarily fastened to a frame for beginning the procedure of fabricating metal foil sign symbols therefrom according to the principles of the present invention;

FIG. 2 is a perspective view showing the cleaning and surface brightening of the metal foil sheet of FIG. 1;

FIG. 3 is a perspective view showing the surface anodizing of the metal foil sheet of FIG. 1;

FIG. 4 is a fragmentary, perspective view showing the prefiring of a series of metal foil sheets similar to that of FIG. 1;

FIG. 5 is a fragmentary, perspective view showing the application of enamel and light transmitting beads to the face surfaces of the metal foil sheets of FIG. 4;

FIG. 6 is a framentary, side elevation showing the firing of the enamel and bead coated sheets of FIG. 5;

FIG. 7 is a fragmentary, side elevational view showing the application of a primer to the back surface of one of the metal foil sheets of FIG. 6;

FIG. 8 is a fragmentary, side elevational view showing the spraying of adhesive to the primed back surface of the foil sheet of FIG. 7;

FIG. 9 is a fragmentary, side elevational view showing the forced drying of the adhesive as applied in FIG. 8;

FIG. 10 is a fragmentary, front elevational view showing the final severing of one of the sign symbols from a metal foil sheet prepared according to the steps illustrated in FIGS. 1 through 9;

FIG. 11 is a fragmentary, horizontal, sectional view of a sign blank having a fired porcelain enamel coating on the face surface thereof;

FIG. 12 is a view similar to FIG. 11, with the porcelain enamal coating having a primer coating applied thereto and dried;

FIG. 13 is a fragmentary, top plan view of the sign blank of FIG. 12 positioned lying horizontally, a template positioned thereover and a sign symbol prepared according to FIGS. 1 through 10 assembled with said sign blank positioned within an appropriate template opening;

FIG. 14 is a fragmentary, vertical, sectional view of the sign blank and template assembly of FIG. 13 showing the sign symbol ready for placement within the template opening;

FIG. 15 is a fragmentary, vertical, sectional view showing the assembly of FIG. 13 positioned within an adhesive curing heater; and FIG. 16 is a fragmentary, horizontal, sectional view of a completed outdoor metal sign according to the principles of the present invention.

DESCRIPTION OF THE BEST EMBODIMENTS CONTEMPLATED

Referring to FIG. 16 of the drawings, a composite light reflecting article according to the present invention is illustrated in the form of an outdoor metal sign, generally indicated at 20, said sign including a sign blank, generally indicated at 22, having a sign symbol, generally indicated at 24, secured thereto by a heat cured adhesive layer 26. The sign blank 22 is formed from a metal sheet 28, preferably aluminum, having a face surface 30 with fired porcelain enamel coating 32 and a primer coating 34.

The sign symbol 24 is formed with a metal foil base 36, also preferably aluminum, having a face surface 38 with a fired porcelain enamel coating 40 and highly light reflecting spheroids or beads 42 partially embedded in said coating. Furthermore, the metal foil base 36 has a back surface or face 44 with a primer coating 46, with the adhesive layer 26 positioned between the sign symbol primer coating 46 and the sign blank primer coating 34.

It is pointed out that as illustrated in FIG. 16, the sign blank and symbol primer coatings 34 and 44, as well as the adhesive layer 26, are exaggerated in thickness in order to more clearly show the positioning thereof. Also, the particulars of the various materials preferred for forming the metal sign 20 will be hereinafter more completely discussed during the description of the preferred embodiment of the procedure for forming the metal sign as described.

The preferred basic procedural steps for fabricating the metal sign 20 of FIG. 16 are illustrated in FIGS. 1 through 15 wherein FIGS. 1 through 10 show the fabrication of the sign symbols 24, FIGS. 11 and 12 the fabrication of the sign blank 22 and FIGS. 13 through 15 the assembly of the sign blank and symbols to finally form the completed sign 20 of FIG. 16.

Beginning with the fabrication of the metal foil sign symbols 24 and referring particularly to FIGS. 1 through 10, the major steps of the symbol fabrication are illustrated in sequence. Furthermore, the particular symbol chosen for illustartion is the letter A, which has merely been chosen at random as representing many types of symbols which could be fabricated in substantially the identical manner. In other words, it is unimportant whether the symbols are letters, figures or other forms of representations normally found on the various highway, advertising and other forms of signs, and all of said symbols may be formed in the same manner.

As shown in FIG. 1, a metal foil sheet 48 is temporarily secured to a supporting frame 50, and as an example, sheet 48 may be 1145–H18 aluminum foil, preferably in the order of .004 inch thickness. The frame mounted foil sheet 48 is first cleaned by immersing the same in a usual inhibited alkaline cleaner bath having a temperature of approximately 150° F. for five to ten minutes, followed by thorough rinsing in water at room temperature, said alkaline bath being of usual form well known to those skilled in the art. As shown in FIG. 2, the foil sheet 48 is then surface brightened by dipping the same in an acid brightening bath 52 for one to one and one-half minutes, said acid brightening bath containing a nitric acid, phosphoric acid and water mixture, and being followed by a water rinse at room temperature.

Immediately after said brightening and rinsing, the foil sheet 48 is placed in an anodizing bath 54 shown in FIG. 3 for from two to two and one-half minutes. The anodizing bath 54 contains a sulfuric acid electrolyte and the anodizing process is carried out at a current of 12 to 15 amperes per square foot, with the bath being at a temperature of 68° F. to 72° F. the anodizing of the foil sheet 48 is followed by consecutive room temperature water rinse, hot water rinse and room temperature water rinse, with ultimate drying.

Thus, at this point in the process, the surfaces of the foil sheet 48, and particularly that surface to ultimately become the previously described face surface 38 of the metal foil base 36 forming the sign symbol 24, are thoroughly cleaned and brightened so as to be light reflective surfaces. Also, such surfaces are thoroughly protected by the later anodizing. Despite this, however, it is important in the following procedural steps that the foil sheet 48 will be carefully handled so as to prevent any contamination to the sheet surfaces.

The next fabrication step and still in the previously described sheet form prior to the forming of any distinguishable symbols, comprises the prefiring of the foil sheet 48 by conveying such sheet through a conventional atmosphere furnace 56 shown in FIG. 4 and having a furnace temperature in the order of 1,000° F. After reception of the foil sheet 48 from the prefiring furnace 56, said sheet is cooled and then conveyed, with what will ultimately become the face surfaces 38 of the symbol foil bases 36 facing upwardly, progressively beneath enamel spray guns 58, a bead spreader 60 and through a drying furnace 62, all as shown in FIG. 5.

The enamel sprayed from the spray guns 58 is of a conventional type which forms porcelain enamel after firing and is deposited in a closely controlled thickness of 0.0015 to 0.0021 inch over the surface of the foil sheet 48. The beads spread by the bead spreader 60 are glass, highly light transmitting beads having diameters of 0.0023 inch to 0.00325 inch so that said beads may embed into the enamel coating and closely abut the surface of the foil sheet 48, while still projecting above said enamel coating. Furthermore, the beads are spread over the surface of the foil sheet 48 in sufficient numbers so as to be closely abutting one another in a single layer and completely covering said surface.

The enamel coating on the foil sheet 48 is dried sufficiently in the drying furnace 62 so that all excess beads may be dumped off and only the desired single layer of beads remains, after which, the enamel and bead coated foil sheet 48 is conveyed through an enamel firing furnace 64 shown in FIG. 6. The enamel firing takes place at a temperature of 1,000° F. and ultimately provides the foil sheet 48 with a fired porcelain enamel face surface having the beads partially embedded therein and retained on the foil sheet surface by the porcelain enamel.

The foil sheet 48 is then positioned in a suitable holder 66 with what will ultimately become the symbol back faces 44 facing upwardly, that is, the faces thereof reverse from the faces just porcelain enameled and bead coated. A primer coating is then applied, as shown in FIG. 7, followed by an adhesive layer, as shown in FIG. 8, the primer being of the type which rids the surface of moisture and provides final moisture resistance and the adhesive, for instance, being an organic resin adhesive which is thermosetting at a minimum curing temperature of 325° F. to 335° F., although other adhesives can be used, such as thermoplastic adhesives having curing temperatures as low as 200° F. After force drying the adhesive layer by conveying the foil sheet 48 through a drying oven 68 having a temperature below the curing temperature of the particular adhesive, as shown in FIG. 9, the foil sheet is ready for the final forming of distinguishable sign symbols 24 therefrom.

As shown in FIG. 10, the foil sheet 48 has had a representative sign symbol 24 in the form of the letter A cut therefrom. Such symbols may be cut in any conventional form, being careful not to disturb the surfaces of the final sign symbols. Furthermore, each of the sign symbols 24, as hereinbefore described, will comprise a metal foil base 36 having the porcelain enamel coating 40 and beads 42 on the face surface 38 thereof and having the primer coating 46 and adhesive layer 26 on the back face 44 thereof, the adhesive layer 26, however, being in an uncured or nonadhering state.

As hereinbefore stated, FIGS. 11 and 12 show the fabrication of the sign blank 22, said sign blank being formed in any size or shape desirable. As shown in FIG. 11, the metal sheet 28 is formed with the porcelain enamel coating 32 on the face surface 30 thereof, said porcelain enamel coating being applied by spraying an enamel capable of forming said porcelain enamel after firing and then firing the same. The sign blank 22 is completed ready for assembling thereon of the sign symbols 24 by applying a primer coating 34, said primer coating being of a type which rids the porcelain enamel coating surface of moisture and provides final moisture resistance in the completed sign construction.

Beginning the final assembly steps to provide the completed metal sign 20, said steps being shown sequentially in FIGS. 13 through 15, a copy assembly template 70 is formed, as shown in FIG. 13, and having appropriate symbol cutouts 72 therein conforming to the desired sign symbols 24 and the intended placement thereof on the completed sign blank 22. The template 70 is then positioned over the front face of the sign blank 22, that is, over the primer and porcelain enamel coatings 32 and 34 of the sign blank, with the appropriate sign symbols 24 being positioned in the symbol cutouts 72. As shown in FIG. 14, a sign symbol 24 in the configuration of the letter A overlies the appropriate symbol cutout 72, ready for being received therein, and in FIG. 13, said sign symbol has been finally positioned.

After positioning of all of the sign symbols 24 in the template symbol cutouts 72 is completed, the template 70 is covered with a filler panel 74 and the entire assembly placed in a preheated vacuum bonding fixture 76, as shown in FIG. 15. The filler panel 74 serves to press the sign symbols 24 against the sign blank 22 during the bonding process. Furthermore, during said bonding process a vacuum in the order of 26 inches to 29 inches of mercury is drawn within the vacuum bonding fixture 76 and the entire fixture and assembly is held at a temperature of 400° F. for from 12 to 15 minutes by usual heating means, such as an electric heating coil 78, for the previously discussed thermosetting organic resin adhesive, although baking or curing temperatures down to 200° F. might be used for the thermoplastic or some other thermosetting adhesives.

The heating of the assembled metal sign 20 by the bonding fixture 76 causes a curing of the adhesive layer 26 between the sign blank 22 and the sign symbols 24 so as to permanently secure said sign symbols to the sign blank. The term "curing" as used herein is intended to include the transformation of the particular adhesive into at least a once reached plastic state so as to accomplish the adherence desired. Such curing, therefore, completes the metal sign 20 shown in FIG. 16 and previously described.

Thus, according to the principles of the present invention, a composite light reflecting article, such as a sign and the like, may be provided at a relatively low cost, yet which is highly weather resistant and durable. By forming the sign symbols 24 separate from the sign blanks 22 and then mounting said symbols on said blanks by means of a baked adhesive layer 26, it is possible to thoroughly inspect the sign symbols prior to said mounting, thereby virtually eliminating scrap costs and problems in the final metal sign 20. Furthermore, by pre-manufacturing and stocking sign blanks 22 of various size and shape, and sign symbols 24 of various size and configuration, a final metal sign 20 may be quickly fabricated from stock parts with merely the performing of the final baked adhesive mounting of the sign symbols on a particular sign blank so as to provide the maximum of manufacturing versatility, while still filling sign orders with a minimum of delay.

Still further, according to the principles of the present invention, long durability and weather resistance of the final metal signs 20 is assured through the particulars of the construction materials thereof. The sign blanks 22 may be formed of sheet aluminum, the sign symbols 24 may be formed of aluminum foil, the respective enamel coatings thereof may be fired porcelain enamel coatings and the light transmitting glass spheroids or beads 42 are permanently adhered to the sign symbols through the permanent fired porcelain enamel coatings thereof. Also, and equally as important, metal foil sign symbols 24 are mounted on the sign blanks 22 through a baked adhesive layer 26 which is baked at a relatively high temperature without adversely affecting the preformed sign symbols and blanks to provide a final metal sign construction which will not deteriorate under exposure to the most severe weather conditions throughout a long period of useful life.

I claim:

1. In a composite light reflecting article such as an outdoor metal sign and the like, the combination of: a sheet-like metal sign blank having a face surface, a fired porcelain enamel coating on said blank face surface; a sign symbol including a metal foil base having a light reflective face surface and a backing surface, a multiplicity of adjacent light transmitting spheroids substantially totally covering said base face surface closely juxtaposed to said base face surface, a fired porcelain enamel coating on said base face surface encompassing parts of each of said spheroids with other parts of each of said spheroids projecting from said coating, said coating permanently securing said spheroids to said base face surface; and a baked adhesive between said symbol base backing surface and said coating on said sign blank face surface permanently securing said symbol on said sign blank.

2. An article as defined in claim 1 in which said symbol base is aluminum foil.

3. An article as defined in claim 1 in which said symbol base is aluminum foil in the order of .004 inch thickness.

4. An article as defined in claim 1 in which said symbol base is aluminum foil having an anodized light reflective face surface.

5. An article as defined in claim 1 in which said sign blank is formed of sheet aluminum; and in which said symbol base is aluminum foil.

6. An article as defined in claim 1 in which said sign blank is formed of sheet aluminum; and in which said symbol base is aluminum foil having an anodized light reflective face surface.

References Cited

UNITED STATES PATENTS

| | | | |
|---|---|---|---|
| 1,860,719 | 5/1932 | Miller | 40—135 |
| 1,902,440 | 3/1933 | Gill. | |
| 2,422,256 | 6/1947 | Phillippi | 40—135 |
| 2,827,720 | 3/1958 | Phillippi. | |
| 3,247,005 | 4/1966 | Parry et al. | |

EUGENE R. CAPOZIO, Primary Examiner

W. J. CONTRERAS, Assistant Examiner